United States Patent [19]

Goto et al.

[11] Patent Number: 4,712,149
[45] Date of Patent: Dec. 8, 1987

[54] RECORDING TAPE CASSETTE

[75] Inventors: Shinichi Goto, Kyoto; Kenji Ogiro, Yokohama, both of Japan

[73] Assignees: Hitachi Maxell, Ltd., Osaka; Hitachi, Ltd., Tokyo, both of Japan

[21] Appl. No.: 902,113

[22] Filed: Aug. 29, 1986

Related U.S. Application Data

[63] Continuation of Ser. No. 553,070, Nov. 18, 1983, abandoned.

[30] Foreign Application Priority Data

Nov. 20, 1982 [JP] Japan .............................. 57-175777[U]

[51] Int. Cl.$^4$ ............................................ G11B 23/02
[52] U.S. Cl. ................................. 360/132; 242/199
[58] Field of Search .............................. 360/132, 95;
242/197–200; 206/387

[56] References Cited

U.S. PATENT DOCUMENTS 4,386,746  6/1983  Okamura .............................. 242/199
4,418,373 11/1983  Fujimori ............................... 242/199

Primary Examiner—A. J. Heinz
Attorney, Agent, or Firm—Birch, Stewart, Kolasch & Birch

[57] ABSTRACT

In a recording tape cassette having a recording tape and a pair of tape drawing openings defined at the front portion of the tape cassette by a top front wall, a bottom front wall, and a pair of generally vertical side walls so that the recording tape is drawn out from one of the tape drawing openings and taken in the tape cassette passed through another tape drawing opening, and a pair of inner vertical walls for guiding the recording tape in a vertical attitude the front edge of the top front wall is set back from the frontmost portion of the inner vertical walls.

4 Claims, 6 Drawing Figures

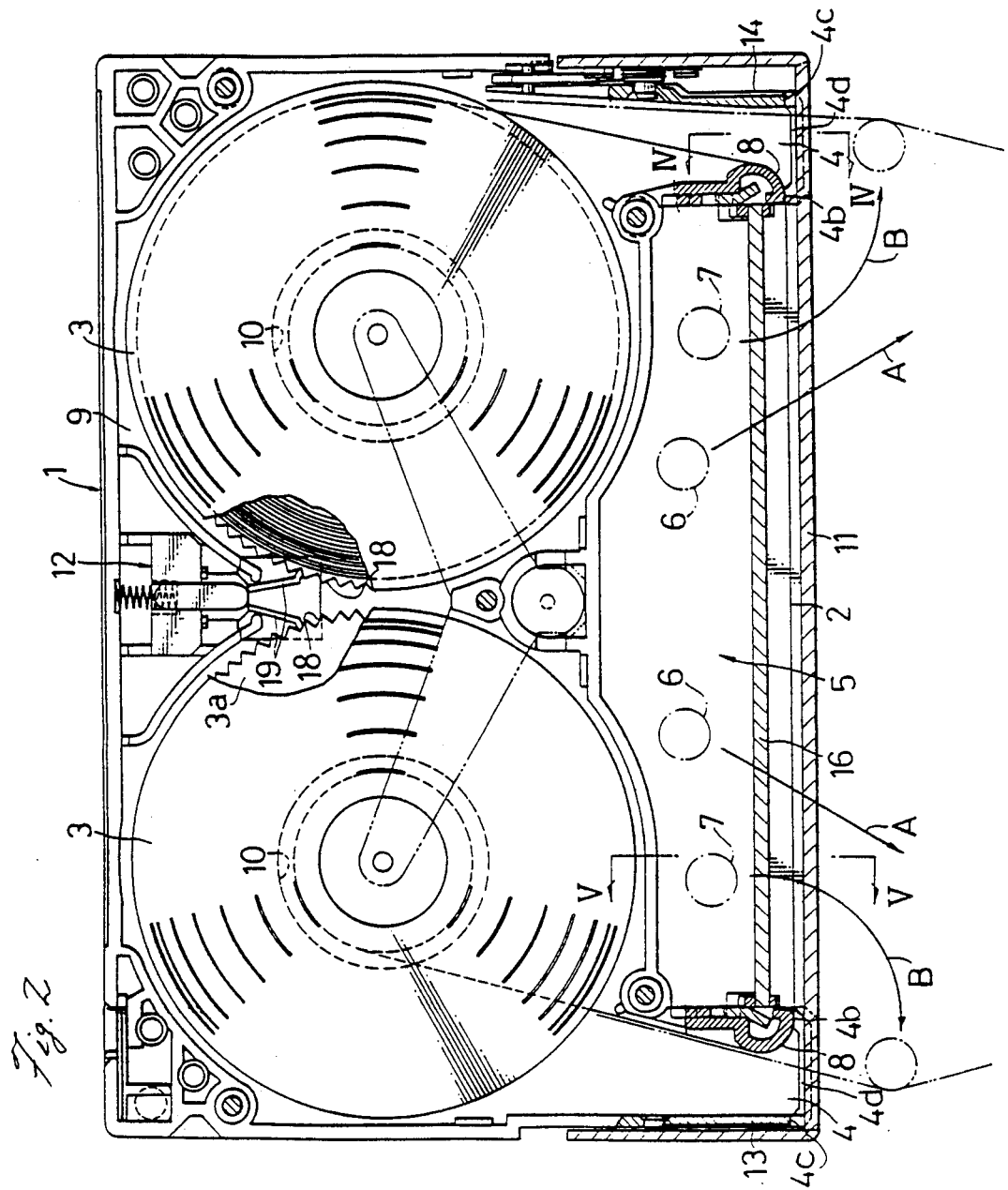

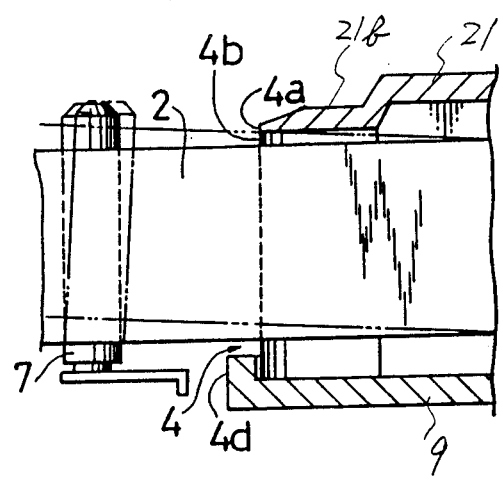
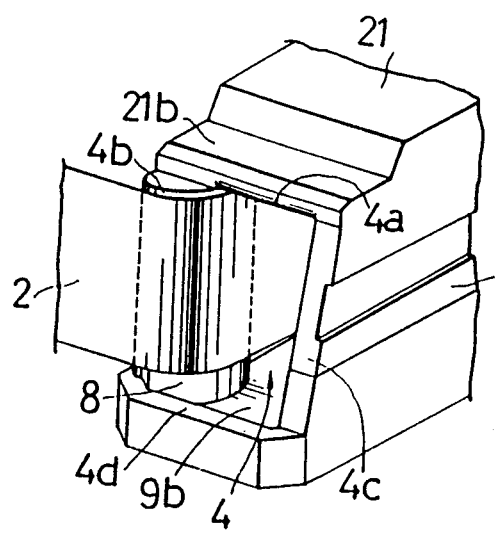

RECORDING TAPE CASSETTE

This application is a continuation of application Ser. No. 553,070 filed on Nov. 18, 1983, now abandoned.

FIELD OF THE INVENTION

The present invention relates to a recording tape cassette in which a recording tape is drawn out of the tape cassette from an opening defined on the front part of the cassette by one or more tape guide pins in a tape player.

BACKGROUND OF THE INVENTION

In a small sized video tape cassette 1 as shown in FIGS. 1 through 3, a video tape 2 wound on a pair of tape reels 3 is adapted to be released from one of the tape reels 3 passing one of a pair of tape drawing openings 4 defined on both the left and right end portions of the tape cassette 1, running along a pocket 5 defined between the pair of the tape drawing openings 4 and in turn the video tape 2 is taken up by the tape reel passing through the other tape drawing opening 4 with the intermediate portion of the video tape movably supported by a pair of cylindrical column members 4b and 4c projected vertically adjacent to both of the tape drawing openings 4. When the video tape used mounted on a video tape player (not shown), a pair of tape drawing pins 6 and a pair of tape guide pins 7 provided on the video tape player are introduced into the pocket 5 behind the video tape 2 from below and are moved in the front direction as shown by arrow mark A (FIG. 2) away from the tape cassette 1 engaging with the video tape 2, so that the video tape 2 is drawn out of the tape cassette 1 towards a recording head (not shown).

In the conventional video tape cassettes of the above type, front edges 4a of a top section 1a for defining the top ends of the tape drawing openings 4 are adapted to extend up to the front end of the column members 4b and 4c as shown in FIG. 3. When the conventional tape cassette as described above is mounted on the video tape player, if the tape guide pin 7 is erroneously slanted from the vertical axis as shown in FIG. 3 by a stretching force of the video tape 2 due to an inaccuracy of the assembly of the tape guide pins, the video tape 2 is displaced upwardly as shown in chain lines in FIG. 3 with the top edge of the video tape undesirably rubbed with the corner of the lower surface of the front edge 4a of the top section 1a whereby the video tape 2 is bent and damaged.

SUMMARY OF THE INVENTION

An essential object of the present invention is to provide a tape cassette of the above type which prevents undesired engagement of the edge portion of the recording tape with the front edge portion of the top section of the tape cassette upon the drawing out of the recording tape from the tape drawing opening of the tape cassette even if the recording tape is displaced upwardly.

BRIEF DESCRIPTION OF THE DRAWINGS

FIG. 2 is a top plan view of the recording tape cassette shown in FIG. 1 with the top section removed, FIG. 3 is a cross sectional view showing an essential portion of a tape drawing opening of a conventional recording tape cassette, FIG. 4 is a partial perspective view showing the essential portion of the recording tape cassette according to the present invention.

DETAILED DESCRIPTION OF A PREFERRED EMBODIMENT

Figure 1:
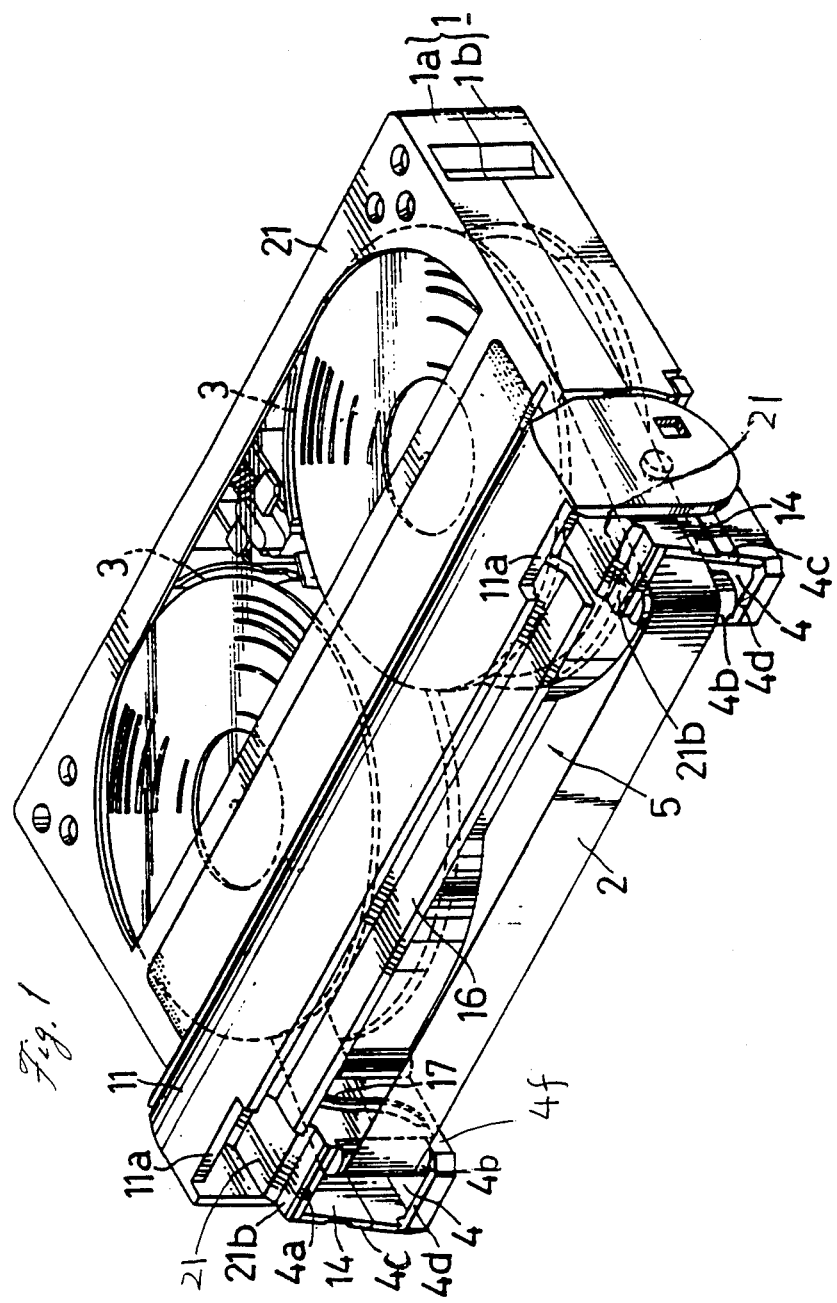
FIG. 1 is a perspective view of a recording tape cassette in which the present invention is employed.

Referring to the drawings, there is shown a small sized video tape cassette 1 having a top section 1a and a bottom section 1b assembled together to provide a tape chamber in a known manner. Inside the tape cassette 1, the tape reels 3 with the magnetic recording tape 2 wound therearound are rotatably mounted on drive shaft insertion holes 10 defined in the bottom section 1b. The tape drawing openings 4 are defined at the front left end portion and the front right end portion of the tape cassette 1. The recording tape 2 is released from one of the tape reels and drawn out from one of the tape drawing openings and taken up by another tape reel passed through another tape drawing opening. The pocket 5 is defined in a recessed manner between both of the tape drawing openings 4 in the front portion of the tape cassette 1 so that the tape drawing pins 6 and the tape guide pins 7 can be entered in the pocket 5 when the tape cassette 1 is mounted on the video tape player (not shown).

Figure 6:
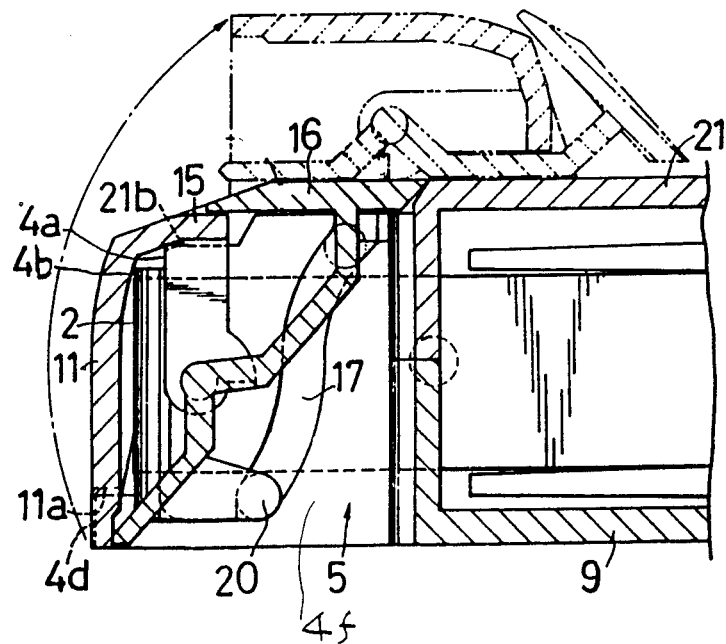
FIG. 6 is a partial cross sectional view showing the front portion of the recording tape cassette according to the present invention.

A front lid 11 is rotatably mounted on the front part of the tape cassette 1 so as to open and close the front face of the tape cassette to protect the recording tape running along the pocket 5 when the tape cassette 1 is not used. When the tape cassette 1 is mounted on the video tape player, the front lid 11 can be automatically opened as shown in FIG. 6 to allow the recording tape 2 to be drawn towards the recording head (not shown) in the video tape player.

Reference numeral 12 shows a reel brake device arranged on the rear central portion inside the tape cassette 1 for applying a braking force to the tape reel 3 by engaging a brake member 19 in one of the teeth 18 formed on the lower flange 3a of the tape reel 3.

Since the pocket 5 is formed in the recessed manner, the recording tape 2 may be stained by dust or the like which may enter from the opening of the pocket 5 even if the front face of the tape cassette 1 is closed by the front lid 11 when the tape cassette 1 is not used. In order to prevent this drawback, a dust cover 16 is pivotally mounted inside the front lid 11 to enclose the intermediate portion of the recording tape 2 and to seal the top opening of the pocket 5 when the tape cassette 1 is not used. The dust cover 16 is provided with a pair of slide pins 20 slidably engaged with cam slots 17 defined in the inside faces of the walls 4f defining both sides of the pocket 5 so that when the front lid 11 is opened, the dust cover 16 can be moved upward along the cam clots 17 without interfering with the recording tape 2.

Each of the tape drawing opening 4 has a generally rectangular shape in front view and is defined by the top front wall member 21b having the front edge 4a, a bottom front wall member 4d formed in parallel with the top front wall member 21b, the inner vertical wall 4f having a semi cylindrical surface 4b at its front end portion and an outer vertical wall member 4c opposing in parallel to the inner vertical wall member 4f. The inner vertical wall member 4f is vertically projected from the bottom wall 9 of the bottom section 1b with the top end thereof contacting with the lower surface of the top front wall 21b when the bottom section 1b and the top section 1a are assembled together. The front end portion of the inner vertical wall 4f is formed by a hollow semi cylindrical member acting as the guide member 8 for slidably guiding the recording tape 2 in a vertical attitude. The outer vertical wall member 4c is formed by the side walls of the top section 1a and the bottom section 1b. Therefore, the front edge of the outer vertical wall 4c is part of the side wall 14 of the tape cassette 1.

The bottom front wall member 4d is formed by projecting the part of the bottom wall 9a of the bottom section 1b slightly in the front direction from the front edge of the lowest portion of the side wall of the tape cassette 1. The level of the upper surface of the bottom front wall member 4d is slightly higher than the upper surface of the bottom wall 9a of the bottom section 1b so as to regulate the level of the height of the recording tape 2 and to fit in the recesses 11a defined in both corners of the bottom portion of the front lid 11 when the front lid is closed.

The top front wall member 21b is formed by projecting a part of the top wall 21 of the top section 1a and the front edge 4a is ended at an inward position from the frontmost edge of the cylindrical surface 4b of the inner vertical wall 4f with the distance d. Preferably, the distance d between the frontmost edge of the cylindrical surface 4b and the front edge 4a is larger than the difference between the gap g of the lower surface of the top front wall 21b and the upper surface of the bottom front wall 4d and the width w of the recording tape 2. In other words, the distance d may preferably be larger than the play provided for the vertical displacement of the recording tape 2. The front face of the outer vertical wall 4c is slanted in such a manner that the lower portion thereof is projected frontward from the front face of the upper portion of the outer vertical wall 4c so that the front corner portion of the bottom wall of the bottom section 1b can be reinforced by the projected part of the outer vertical wall 4c.

Figure 5:
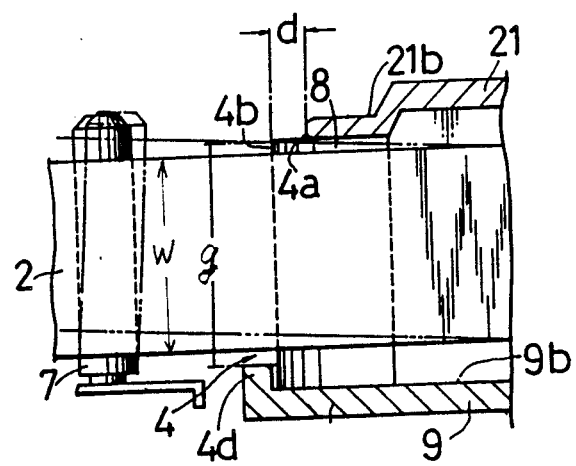
FIG. 5 is a partial cross sectional view of FIG. 4.

As clearly shown in FIG. 5, the upper top surface of the top front wall 21b is stepped lower than the upper surface of the top wall 21 of the top section 1a so that the upper surface of a reinforcing plate 15 of the front lid 11 is flush with the upper surface of the top wall 21 when the front lid 11 is in the closed position.

Since the frontmost edge 4a of the top front wall 21b of the tape drawing opening 4 is set back from the frontmost edge of the cylindrical surface 4b which act as the tape supporting member, the top edge of the recording tape 2 does not abut on the top front wall member 21b even if the recording tape is undesirably displaced upwardly due to the slant of the tape guide pins 7 when the recording tape cassette 1 is mounted on and used in a video tape player, whereby the recording tape 2 can be prevented from being undesirably bent or being damaged.

Although the present invention is described with reference to the video tape cassette, the present invention can be applied to the various types of tape cassettes and various types of recording tapes.

What is claimed is:

1. A recording tape cassette comprising a top section and bottom section having a recording tape wound on a pair of tape reels and a pair of tape drawing openings each of which is defined at a front left end and a front right end of a front portion of the tape cassette by top front walls, bottom front walls, and a pair of generally vertical side walls, said recording tape being drawn out of said tape cassette from one of said tape drawing openings and returned to the tape cassette passed through a second tape drawing opening, said recording tape cassette comprising within each of said defined tape drawing openings inner vertical guide walls projecting from said bottom front wall, a top end thereof contacting a lower surface of said top front walls, each of said inner vertical walls having a hollow semi-cylindrical surface along a front end portion thereof for guiding said recording tape in a vertical attitude, a front edge of each of said top front walls being set back from a frontmost portion of said cylindrical surfaces where said lower surfaces of said top walls contact said top ends of said vertical guide walls thereby providing added support to said guide walls preventing bending thereof under force applied by said recording tape, said set back feature preventing damage to said tape if displaced in an upward direction.

2. The recording tape cassette according to claim 1, wherein the distance between the front edge of the respective top front wall and the frontmost portion of the respective inner vertical guide wall is greater than play in a widthwise direction of the recording tape in a space between said lower surface of said top front walls and an upper surface of said bottom front walls, such that said upper surface of said respective bottom front wall acts to regulate the height of said recording tape.

3. The recording tape cassette according to claim 1, wherein said respective upper surface of said top front wall is stepped lower than an upper surface of a top wall of said top section of the tape cassette.

4. A recording tape cassette comprising a top section and bottom section having a recording tape wound on a pair of tape reels and a pair of tape drawing openings each of which is defined at a front left end and a front right end of a front portion of the tape cassette by top front walls, bottom front walls, and a pair of generally vertical side walls, said recording tape being drawn out of said tape cassette from one of said tape drawing openings and returned to the tape cassette passed through a second tape drawing opening, said recording tape being supported by first and second hollow semi-cylindrically shaped tape supporting members vertically provided on said bottom front walls for supporting said recording tape in a vertical attitude, respective front edges of each of said top front walls being set back from frontmost portions of each of said tape supporting members where a lower surface of each of said top front walls contacts respective top ends of said tape support members thereby providing added support to said tape supporting members preventing bending thereof under force applied by said recording tape, said set back feature preventing damage to said tape if displaced in an upward direction.

* * * * *